(12) United States Patent
Wild et al.

(10) Patent No.: US 9,968,220 B2
(45) Date of Patent: May 15, 2018

(54) DRAIN WATER COLLECTION WITH AUTOMATIC EMPTYING AND SPILLAGE REDUCTION FUNCTIONALITY FOR COOKING DEVICES

(71) Applicant: Convotherm Elektrogerate GmbH, Eglfing (DE)

(72) Inventors: Hannes Wild, Riegsee (DE); Martina Feierabend, Eglfing (DE); Konstantin Stroh, Eglfing (DE)

(73) Assignee: CONVOTHERM ELEKTROGERAETE GMBH, Eglfing (DE)

(*) Notice: Subject to any disclaimer, the term of this patent is extended or adjusted under 35 U.S.C. 154(b) by 0 days. days.

(21) Appl. No.: 14/403,411

(22) PCT Filed: Jun. 20, 2013

(86) PCT No.: PCT/IB2013/001303
§ 371 (c)(1),
(2) Date: Nov. 24, 2014

(87) PCT Pub. No.: WO2013/190368
PCT Pub. Date: Dec. 27, 2013

(65) Prior Publication Data
US 2016/0198893 A1 Jul. 14, 2016

Related U.S. Application Data

(60) Provisional application No. 61/662,653, filed on Jun. 21, 2012.

(51) Int. Cl.
*A47J 36/34* (2006.01)
(52) U.S. Cl.
CPC .................................. *A47J 36/34* (2013.01)

(58) Field of Classification Search
CPC ............. A47J 37/00; A47J 37/07; A47J 36/34
(Continued)

(56) References Cited

U.S. PATENT DOCUMENTS 3,964,378 A * 6/1976 Dunkelman ........ A47J 37/1285
99/375
4,773,319 A * 9/1988 Holland .............. A47J 37/0713
126/25 R
(Continued)

FOREIGN PATENT DOCUMENTS

CN 2666322 Y 12/2004
DE 102006031581 A1 1/2008
(Continued)

OTHER PUBLICATIONS

International Preliminary Report on Patentability dated Dec. 23, 2014 for PCT application No. PCT/IB2013/001303.
(Continued)

*Primary Examiner* — David Angwin
*Assistant Examiner* — Spencer H Kirkwood
(74) *Attorney, Agent, or Firm* — Ohlandt, Greeley, Ruggiero & Perle, LLP

(57) ABSTRACT

There are disclosed cooking devices and methods for automatically emptying the drain/waste water of such devices with minimal spillage of the drain/waste water. More particularly, disclosed are structures for automatically emptying the drain/waste water of cooking devices that employ a moveable collection device with minimal spillage of the drain/waste water. The cooking devices of the present disclosure provide increased safety by: reducing the possibility of a slippery floor; reducing the potential of food/food area contamination; and reducing the possibility of water penetrating building construction or causing mold growth. Also disclosed are methods of suing such devices and methods of (Continued)

retrofitting cooking devices with such means for automatically emptying the drain/waste water.

18 Claims, 6 Drawing Sheets

(58) Field of Classification Search
USPC .......................................................... 99/444
See application file for complete search history.

(56) References Cited

U.S. PATENT DOCUMENTS

| | | | | |
|---|---|---|---|---|
| 4,915,261 A * | 4/1990 | Strenger | ............... | A47J 31/407 222/107 |
| 5,285,824 A * | 2/1994 | Krstovic | ............... | F16N 31/002 141/1 |
| 5,346,245 A * | 9/1994 | Budrow | ................ | B60D 1/155 220/757 |
| 7,555,914 B1 * | 7/2009 | Davis | .................... | F24F 1/0007 62/272 |

FOREIGN PATENT DOCUMENTS

| | | |
|---|---|---|
| EP | 0425474 A1 | 5/1991 |
| EP | 2389808 A1 | 11/2011 |

OTHER PUBLICATIONS

Chinese Office Action dated Feb. 2, 2016 for Chinese application No. 201380040737.X.
International Search Report dated Nov. 11, 2013 for PCT application No. PCT/IB2013/001303.
Written Opinion dated Nov. 11, 2013 for PCT application No. PCT/IB2013/001303.
Chinese Office Action dated Oct. 8, 2016 for Chinese application No. 201380040737.
European Office Action dated Nov. 8, 2016 for European application No. 13745714.9.
European Office Action dated May 19, 2016 for European application No. 13 745 714.9.

* cited by examiner ual Patent
DRAIN WATER COLLECTION WITH AUTOMATIC EMPTYING AND SPILLAGE REDUCTION FUNCTIONALITY FOR COOKING DEVICES

CROSS-REFERENCED APPLICATION

This application is related, and claims priority, to PCT International Patent Application No. PCT/IB2013/001303 filed on Jun. 20, 2013, and U.S. Provisional Application No. 61/662,653, filed on Jun. 21, 2012 that is incorporated herein in its entirety by reference thereto.

BACKGROUND

1. Field of the Disclosure

The present disclosure relates to cooking devices and methods for automatically emptying the drain/waste water of such cooking devices with minimal spillage of the drain/waste water. More particularly, the present disclosure relates to devices for automatically emptying the drain/waste water of cooking devices that employing moveable collection devices referred to in the state of the art as a "water taxi" and provides for minimal spillage of the drain/waste water and simplified disposal of the drain/waste water. The moveable collection devices of the present disclosure provide increased safety by reducing the possibility of a slippery floor, reducing the potential of food/food area contamination and reducing the possibility of water penetrating building construction or causing mold growth. The present disclosure also relates to methods of retrofitting cooking devices with such moveable collection devices for automatically emptying the drain/waste water.

2. Background of the Disclosure

Already known are moveable collection devices that can hold drain/waste water of cooking devices. These systems are sometimes called "water taxis", and are often used when the cooking devices cannot be connected or hard-piped to a floor drain system. For example, when the cooking device is installed at a distance from a drain system of the building where the cooking device is installed, the drain system of the cooking device may not be able to be connected or piped directly into that drain system. In this situation, the drain/waste water that is produced by the cooking device is fed through a pipe system of, or attached to, the cooking device, that ends in the opening of the water taxi. When the water taxi is filled it is wheeled to a nearby floor drain, where the water is disposed.

The types of water taxi systems disclosed in the above state of the art suffer from several drawbacks. One such drawback is that when the water taxi is filled with drain/waste water the device needs to be wheeled to a floor drain for emptying. During this emptying phase, the cooking device is often still in operation causing a constant flow of drain/waste water. Drain/waste water will exit the cooking device in normal operation due to moisture from the cooking cycle in the form of condensed steam or as condensed moisture from the food being cooked. Greater quantities of water will, of course, exit the cooking device during the cleaning cycle when larger quantities of water are intentionally used to clean the inside of the cooking device. In either case, the drain/waste water will flow out of the drain pipe system of the cooking device and will fall on the kitchen floor. This situation results in safety concerns due to slippery floors, hygienic issues surrounding the presence of waste water in the environment, water possibly penetrating the building construction and forming areas of mold or other pathogens over time, etc.

Also, according to the known state of the art devices, there is a lack of any indication of when the water taxi is full and needs emptying. Therefore, a need exists for a moveable collection device for the removal of drain/waste water that does not suffer from the drawbacks of the state of the art.

Some of these problems are addressed in a system disclosed in DE 10 2010 017 177. In the disclosed system, the possibility of additional drain/waste water exiting and being spilled on the floor is somewhat alleviated. However, the disclosed system requires that the cooking device be shut off for emptying the water taxi and this is accomplished by electromechanical control of the main controller of the cooking device. Also, the system disclosed determines if the drain/waste water level is such that the water taxi needs to be emptied. However, once again, the drain/waste water level sensor is connected to the cooking device main controller and shuts off the cooking device when a filled state is reached. Thus, the disclosed system requires that the operational cycle of the cooking device be terminated (whether a cooking cycle or cleaning cycle) if the water taxi is removed or becomes full. In addition, the water taxi itself is in a complex arrangement on a sort of "trolley" or "platform" and is fixed on that trolley, has a complex filling and emptying structure, and is controlled in its operation, in part, by the placement of the trolley. For example, the disclosed water taxi has a filling port near its upper surface, and an emptying port different from the filling port disposed on its bottom surface. The filling port must be aligned with an external rigid drain pipe in order to accommodate receiving the drain/waste water. The emptying port is also complex in design, requiring communication to a separate valve that must be actuated between an open and closed position. Also included as part of the water taxi is a complex arrangement for the communication between the emptying port and the valve associated therewith, including a separate drain line. In addition, the disclosed system includes a complex drain/waste water drainage system that includes a plurality of valves that are electromechanically controlled by either the water taxi level sensor, by the water taxi trolley position, or by the door of the cabinet where the water taxi is placed.

SUMMARY

It is, therefore, an object of the present disclosure to provide a moveable collection device for the removal of drain/waste water from a cooking device that prevents the continual draining of drain/waste water onto the floor while the moveable collection device is out of place and being emptied, even if the operation of the cooking device is not stopped.

It is also an object of the present disclosure to provide a moveable collection device for the removal of drain/waste water from a cooking device in which the moveable collection device provides an indication that it is ready to be emptied by a drain/waste water level sensor, but where the sensor, preferably, does not control the operation cycle of the cooking device.

The above and other objects are met by the cooking devices and methods of the present disclosure. The cooking device itself is of general, known design.

One embodiment of the present disclosure relates to a cooking device, in particular a commercial cooking device (such as, preferably, a combisteamer, a baking oven or a microwave oven) comprising a housing including a cooking chamber, a door for opening and closing the cooking chamber, and a drain for allowing drain/waste water to drain from the cooking device. External to the cooking device and in close association with the drain is a drain tray or catch basin that is disposed in cooperative relationship with a moveable collection device for the removal of drain/waste water from the drain tray/catch basin. The flow of drain/waste water into the drain and thereafter into the drain tray/catch basin is, preferably, not controlled by a valve or stop of any sort, and the drain/waste water may continually drain from the cooking device into the drain tray/catch basin even when the moveable collection device is removed. The moveable collection device is disposed in relation to the drain tray/catch basin so that when the moveable collection device is removed for emptying, the drain tray/catch basin is maintained in position to continue to receive drain/waste water exiting the cooking chamber through the drain, but is configured so that drain/waste water that enters the drain tray/catch basin remains therein until the moveable collection device is returned to position underneath the drain tray/catch basin. This ability of the drain tray/catch basin to continue to receive drain/waste water exiting the cooking device is, preferably, attained without the use of any valve or stop of any sort.

In another embodiment of the present disclosure, a method of operating a cooking device is provided. The method is provided for a cooking device comprised of a housing, a cooking chamber, a door for accessing and closing the cooking chamber, and a drain for allowing drain/waste water to drain from the cooking device and, external to the cooking device and in close association with the drain, a drain tray/catch basin disposed in cooperative relationship with a moveable collection device for the removal of drain/waste water from the drain tray/catch basin, and the method is performed as follows: disposing the moveable collection device in relation to the drain tray/catch basin, collecting drain/waste water from the drain that passes into the drain tray/catch basin, passing the drain/waste water from the drain tray/catch basin to the moveable collection device, removing the moveable collection device for emptying, maintaining the drain tray/catch basin in position to continue to receive drain/waste water exiting the cooking chamber through the drain, and preventing drain/waste water that enters the drain tray/catch basin while the moveable collection device is removed from exiting the drain tray/catch basin.

BRIEF DESCRIPTION OF THE DRAWINGS

Further features, advantages and details of the present disclosure will become apparent from the following description of the drawings in that.

DETAILED DESCRIPTION OF THE DISCLOSURE

Figure 1:
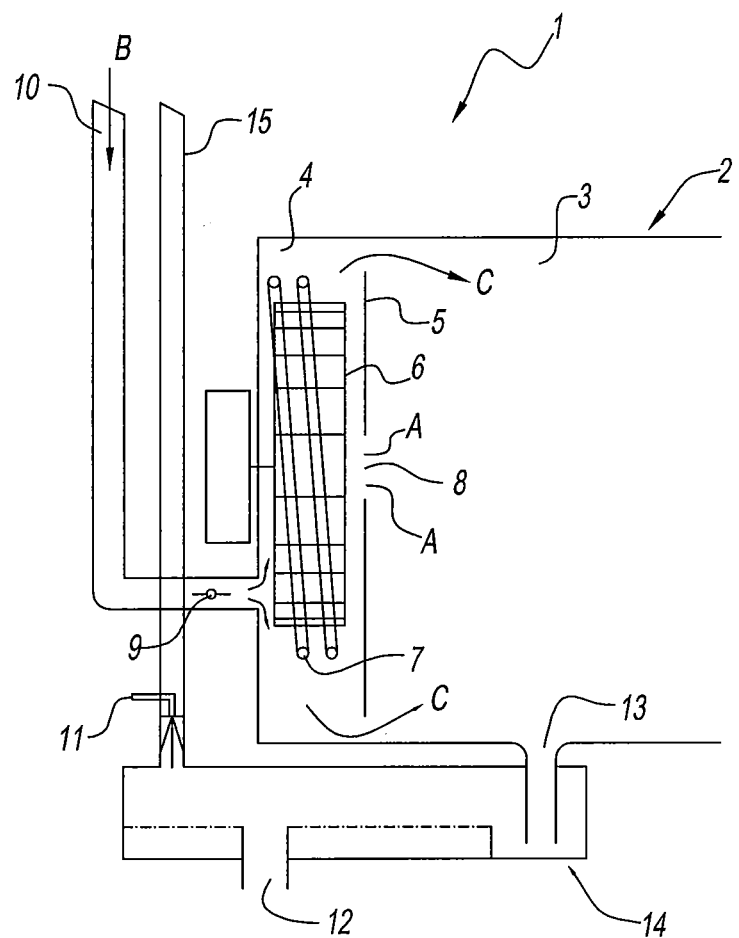
FIG. 1 shows a schematically simplified side cross-sectional view of a cooking device according to the present disclosure.

FIG. 1 shows the cooking device 1 as a generalized combisteamer suitable for use in accordance with the present disclosure. Cooking device 1 in FIG. 1 has a housing 2 containing a cooking chamber 3 and a heating chamber 4 divided by a suction panel 5 that separates cooking chamber 3 from heating chamber 4 and thereby protects a fan wheel 6 and a heating element/coil 7 from being damaged or touched.

Through a central area of suction panel 5 is a suction panel opening 8, through which air is sucked from cooking chamber 3 to heating chamber 4 in the direction of arrows "A" and distributed and heated with fan wheel 6 and heating element/coil 7. During steam cooking, water is distributed within heating chamber 4 through an inlet pipe (not shown) disposed in heating chamber 4. For dehumidification during cooking, a flap 9 is opened and fresh air is sucked into the chamber in the direction of arrow "B" via an intake suction pipe 10. Fresh cold air is sucked into cooking chamber 3 via intake pipe 10 and the cold air flowing through intake pipe 10 is pushed into cooking chamber 3 by fan wheel 6 in the direction of arrows "C", causing wet air in cooking chamber 3 to be pushed out through a drain 13 as condensed heated air from cooking chamber 3 into a condenser tray 14. Thereafter, the condensed heated air collected as liquid in condenser tray 14 drains into and through a drain pipe 12. Heated air exits into the environment through an air outlet pipe 15. A water inlet pipe 11 is often employed for filling condenser tray 14 for various purposes, such as during the cleaning cycle of cooking chamber 3 of cooking device 1. At the time of cleaning, drain pipe 12 will be closed (by a mechanism not shown) so that the cleaning cycle can be completed without the loss of cleaning liquid, etc., through drain pipe 12.

As can be appreciated, and as is known to those skilled in the art, drain/waste water exits cooking device 1 under varied circumstances, for example, during steaming for steam cooking, during dehumidification and, generally, after cleaning as noted above (although when progressing from, for example, a cleaning cycle to a rinsing cycle, drain/waste water may exit cooking device 1 between cycles), but also under normal cooking operation due to moisture from the food being cooked that is driven off and exits cooking chamber 3. Thus, it is not uncommon for drain/waste water to be continually draining from cooking device 1.

Figure 2:
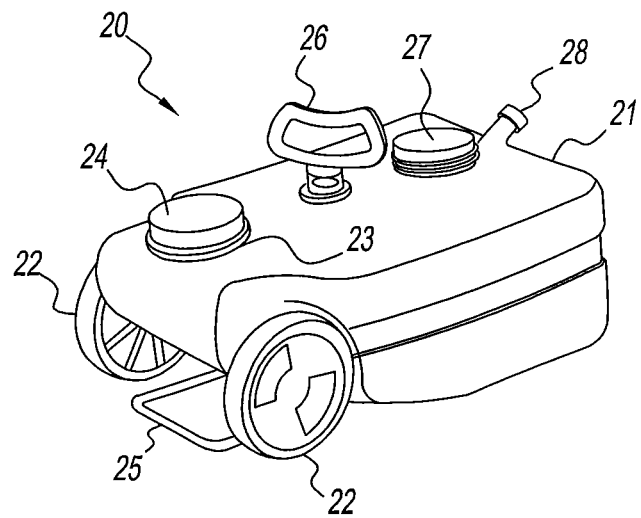
FIG. 2 is a top front perspective view of a moveable collection device according to the present disclosure.

In FIG. 2, a moveable collection device 20 comprises a tank 21 for holding drain/waste water from cooking device 1. Disposed at, preferably, one end of tank 21 and on opposing sides of tank 21 are, also preferably, one or more wheels 22 for ease of transporting moveable collection device 20 from cooking device 1 to a drain where moveable collection device 20 will be emptied. Moveable collection device 20 is not fixed upon a trolley or platform and includes, preferably, its own wheels for moving the moveable collection device from a position to receive drain/waste water to a position to dispose drain/waste water. Disposed on a surface of tank 21 is an opening 23 that, in FIG. 2, is closed and sealed by use of a threaded screw cap 24. Of course, opening 23 could be closed by any suitable means such as a snap closure, cam actuated pressure fitted cap, and similar closures. In the embodiment shown in FIG. 2, opening 23 comprises a threaded portion disposed above the outer surface of moveable collection device 20, the threaded portion of which is suitable to accommodate threaded screw cap 24. In use, opening 23 is disposed in relation to an opening in drain tray/catch basin according to the present disclosure, as will be explained in more detail hereinafter. Opening 23 is also preferably disposed near an edge surface (such as is shown in FIG. 2) of moveable collection device 20 so that when emptying the drain/waste water through opening 23, the emptying is complete, or nearly complete. Opening 23 can of course be disposed in other locations on the surface of tank 21, but other positions may not effect as complete emptying of tank 21. The placement of opening 23 allows for it to be both the "filling" opening for accepting drain/waste water from cooking device 1 and also the "emptying" opening for disposing of drain/waste water from tank 21. In this manner, the structure of moveable collection device 20 does not require a separate opening for emptying on the opposite side/surface from opening 23 of water tank 21 such as is required in the above mentioned DE 10 2010 017 177. It is believed that the opposite, separate emptying openings of the apparatus in the DE document, one for filling and one for emptying, are required because of the "fixed" position of the "water taxi" on the "trolley" disclosed therein.

According to the present disclosure, in operation, when moveable collection device 20 is full and is removed for emptying, screw cap 24 is used to close/seal opening 23 (covered by 24 in FIG. 2) to prevent spillage of drain/waste water from tank 21. Also as part of the embodiment of moveable collection device 20 is a handle 25 that, in FIG. 2, is shown in closed, retracted position. Handle 25 is not unlike, and is similar in function to, the retractable handle commonly used for moving luggage along the ground in airports, on street sidewalks, etc. In FIG. 2, moveable collection device 20 may also comprise elements 26, 27 and 28. Element 26 is a handle that may, in some cases, be used to transport moveable collection device 20 away from cooking device 1 rather than handle 25. Element 27 is a "false" screw cap holder onto which screw cap 24 may be stored while moveable collection device 20 is located in a position relative to cooking device 1 and is collecting drain/waste water. Element 27 is an item of convenience so that screw cap 24 is less likely to be misplaced. Element 28 is an additional optional opening that is also secured, preferably with a cap such as screw cap 24. Element 28 can serve the purpose of accommodating an additional drain pipe from one or more other cooking devices 1 and/or may also be used to accept a drain/waste water level sensor device/filling indicator that may be placed into moveable collection device 20 to provide an indication when moveable collection device is full or nearly full and/or may be used to accept a source of water or other liquid to clean and rinse tank 21 of moveable collection device 20. Element 28 may be omitted altogether.

Figure 3:
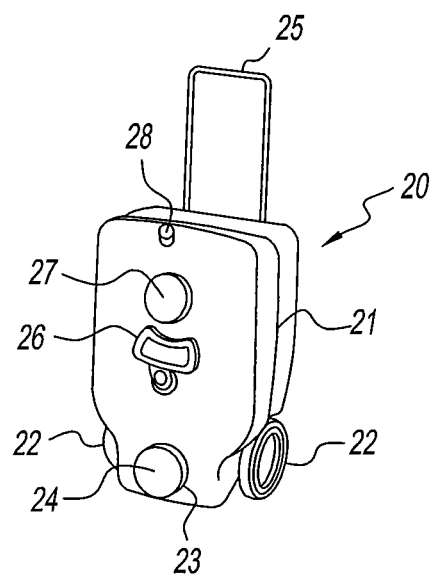
FIG. 3 is a perspective view of a moveable collection device according to the present disclosure in upright position for rolling to a drain for emptying.

FIG. 3 is similar to FIG. 2 but shows moveable collection device 20 in an upright position for moving to and from a drain pipe, both before and after emptying, as the case may be. In FIG. 3, like numerals denote like elements as set forth with respect to FIG. 2.

Figure 4:
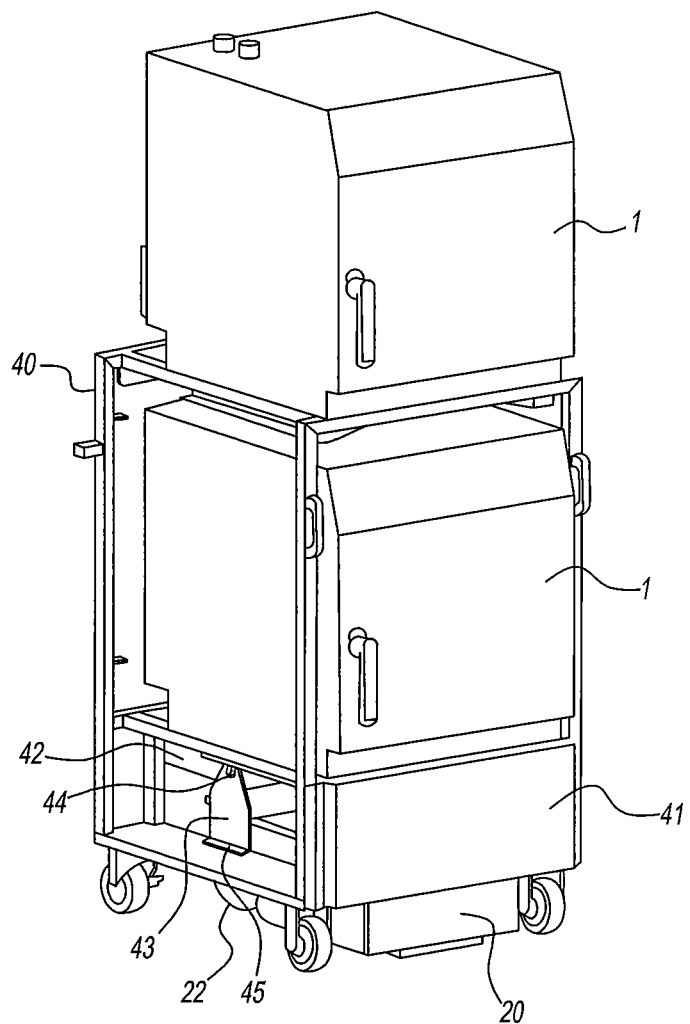
FIG. 4 shows a schematic view of two cooking devices in stacked configuration with a moveable collection device according to the present disclosure disposed thereunder behind a door.

FIG. 4 shows a configuration of moveable collection device 20 of the present disclosure in relationship to a stacked arrangement of cooking devices 1. This embodiment and relationship is for illustrative purposes only. In FIG. 4, it can be seen that two cooking devices 1, similar in general configuration to cooking device 1 of FIG. 1, are disposed above each other in stacked arrangement on a rack 40. Disposed on the lower front side of rack 40 is a door 41 that encloses moveable collection device 20 while in operating (i.e., drain/waste water receiving) position. Door 41 serves to keep moveable collection device 20 in correct position with respect to its receiving drain/waste water, but also serves additional purposes, as will be explained in more detail below. Disposed above and toward one end of moveable collection device 20 is a drain tray/catch basin 42 that is placed in position so as to receive waste/drain waste water exiting cooking device(s) 1, in the embodiment of FIG. 4, through one or more drain pipes (not shown in FIG. 4). As will also be explained in more detail below with respect to the embodiments in FIGS. 4-8, drain tray/catch basin 42 is held in moveable position in relation to moveable collection device 20 and drain pipe(s) by at least one bracket 43. In turn, bracket 43, in the embodiment shown in FIG. 4 and the following description in relation to FIGS. 5-8, is connected to drain tray/catch basin 42 in rotatable fashion via a connector 44, such as a pin or fastener. For support, bracket 43 may also be attached to frame 40 by any suitable means, such as, as shown in FIG. 4, a retaining bracket 45. The means of connecting bracket 43 to drain tray/catch basin 42 is of no particular import, and can be, for example, a rivet, a screw, a pin and similar attachments. In the same manner, the attachment of retaining bracket 45 to frame 40 is of no particular import and retaining bracket 45 may be slidably attached, welded, screwed, glued, or provided with similar attachments.

Figure 5:
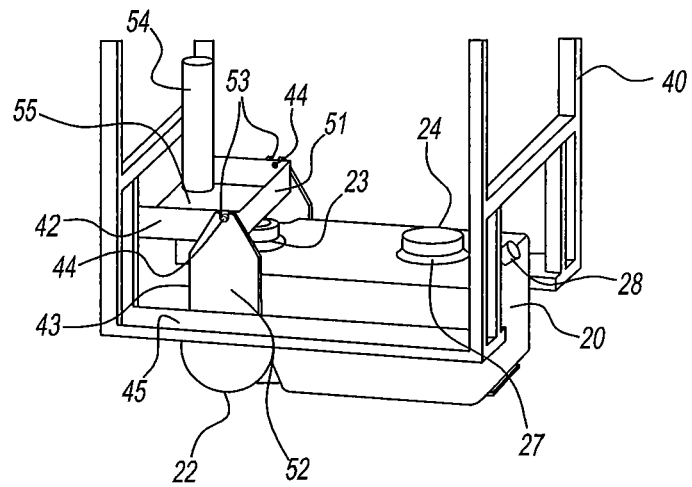
FIGS. 5-6 show an embodiment of the method of present disclosure wherein the moveable collection device is being removed, with the drain tray thereafter disposed in position to continue to catch drain/waste water from the cooking devices.
Figure 6:
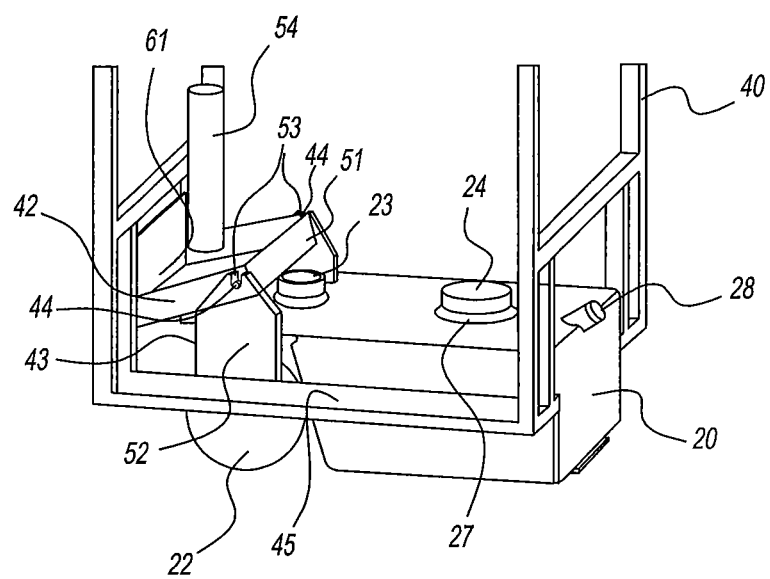

FIG. 5. shows a view of moveable collection device 20 disposed below rack 40 such as shown in FIG. 4. In FIG. 5, cooking devices 1 and door 41 are not shown. In FIGS. 5-6, it can be seen that in the embodiment shown, drain tray/catch basin 42 is rotatably fastened to bracket 43 by connectors 44 disposed on opposite sides of drain tray/catch basin 42 substantially equidistant from the front edge 51 of drain tray/catch basin 42 and connectors 44 are engagingly connected to each vertically disposed portion 52 of bracket 43 via a "notch" or hollow 53 designed for engaging connectors 44. In the embodiment shown in FIGS. 5-8, connectors 44 that hold drain tray/catch basin 42 in rotatable connection to bracket 43 are shown as appendages disposed on each side of drain tray/catch basin 42. Of course, it will be appreciated that connectors 44 can just as easily and conveniently be located on bracket 43 and matingly engaged to receiving portions, such as holes or matching notches on drain tray/catch basin 42. Just as easily, drain tray/catch basin 42 could be rotatably/swingingly connected to rack 40 via, e.g., a bar connected across and disposed above or below drain tray/catch basin 42. As can be seen in FIG. 5, disposed above and toward one edge of drain tray/catch basin 42 is a drain pipe 54 (not shown in FIG. 4), leading from cooking devices 1 (not shown in FIG. 5). Drain pipe 54 is disposed in relation to drain pipe 12 of FIG. 1 so as to receive drain/waste water therefrom. Drain/waste water from drain pipe 54 flows into drain tray/catch basin 42 and is collected and held therein. Disposed in the bottom 55 of drain tray/catch basin 42, at a location preferably disposed away from the entry point of drain/waste water from drain pipe 54 into drain tray/catch basin 42, is an opening (not shown on FIG. 5) that is disposed above opening 23 of moveable collection device 20. Drain tray/catch basin 42 is preferably disposed such that drain/waste water from drain pipe 54 is inclined to run toward the opening (not shown) in bottom 55 of drain tray/catch basin 42 above opening 23 of moveable collection device 20. In the embodiment shown in FIG. 5, screw cap 24 has been removed from opening 23 and transferred to "false" screw cap holder 27, as noted in FIG. 5. Drain/waste water drains from drain tray/catch basin 42 directly into moveable collection device 20 from opening in drain tray/catch basin 42, preferably without the use of any pipe or intervening connector between the opening in drain tray/catch basin 42 and opening 23 of moveable collection device 20.

FIG. 6 shows one embodiment of the interaction between moveable collection device 20 and drain tray/catch basin 42 as moveable collection device 20 is removed from under drain tray/catch basin 42 and out of rack 40 for emptying. In FIG. 6, as moveable collection device 20 is removed from beneath drain tray/catch basin 42, drain tray/catch basin 42 tilts in a manner caused by the placement of drain tray/catch basin 42 in relationship to bracket 43 and connectors 44 on drain tray/catch basin 42. Due to the arrangement of connectors 44 on drain tray/catch basin 42, drain tray/catch basin 42 is caused to tilt downwardly in the area disposed below drain pipe 54, and upwardly in the area disposed above opening 23 of moveable collection device 20. As this movement is effected, drain/waste water is prevented from flowing through the opening (not shown) in bottom 55 of drain tray/catch basin 42 in the area above opening 23 of moveable collection device 20. At the same time, drain/waste water flowing from drain pipe 54 into drain tray/catch basin 42 is caused to collect and remain in drain tray/catch basin 42 in the volume of space created in drain tray/catch basin 42 between the lower edge 61 of drain tray/catch basin 42 and the opening in drain tray/catch basin 42 above opening 23 in moveable collection device 20. Thus, cooking device 1 need not be stopped in its operation or its cooking or cleaning cycle shut off when moveable collection device 20 is removed for emptying, and drain/waste water may continue to exit cooking device 1 via drain pipe 54 without the need for valves or other apparatus/structure to shut the flow of drain/waste water through drain pipe 54. Of course, drain tray/catch basin 42 may be configured, and the relationship between drain tray/catch basin 42 and bracket 43 and connectors 44 modified, so as to adjust the volume heretofore described to accommodate continued flow of drain/waste water from drain pipe 54 as necessary in any particular application (such as the distance from a floor drain into which the drain/waste water stored in moveable collection device 20 must travel before emptying).

Subsequent to the position of moveable collection device 20 depicted in FIG. 6, moveable collection device 20 is moved away from under rack 40, screw cap 24 is removed from "false" cap holder 27 and screwed onto opening 23 of moveable collection device 20 so as to close opening 23. Thereafter, moveable collection device 20 may be taken by rolling or carrying, using either handle 25 or handle 26 according to the embodiments of FIG. 2 or 3, to a remote drain for emptying. As mentioned above, while moveable collection device 20 is not receiving drain/waste water from drain pipe 54, the drain/waste water continues to flow into drain tray/catch basin 42 and is caused to collect and remain in drain tray/catch basin 42 in the volume of space created in tilted drain tray/catch basin 42 between lower edge 61 of drain tray/catch basin 42 and the opening (not shown) in drain tray/catch basin 42 previously disposed above opening 23 in moveable collection device 20.

Figure 7:
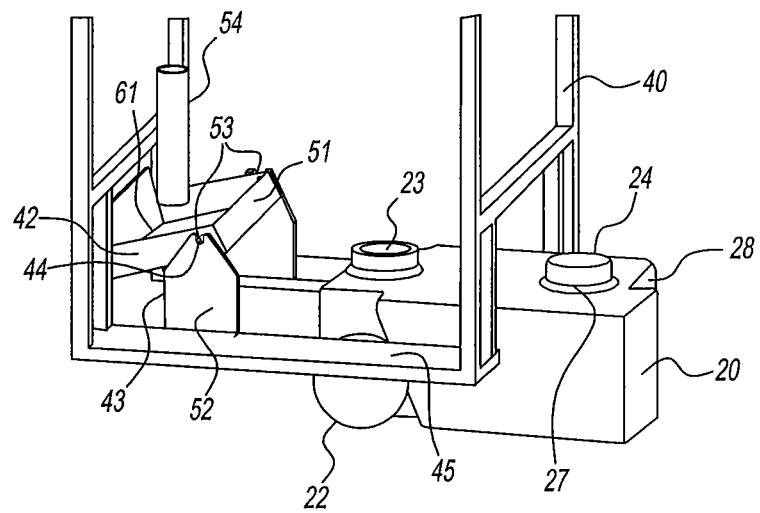
FIGS. 7-8 show the same embodiment as shown in FIGS. 5-6 wherein the moveable collection device is being placed back into position to receive drain/waste water from the drain tray.
Figure 8:
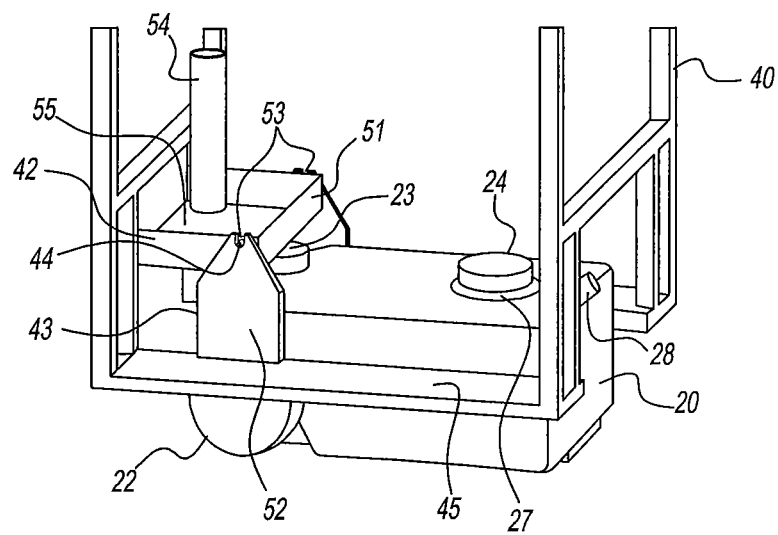

After moveable collection device 20 is emptied, it is returned to place in relation to drain tray/catch basin 42, and the steps described above with respect to FIGS. 5 and 6 are reversed. FIGS. 7 and 8 show these reversed steps. In FIG. 7 moveable collection device 20 is placed back into position to resume receiving drain/waste water from drain tray/catch basin 42. As shown in FIG. 7, screw cap 24 is again placed on "false" screw cap holder 27 for retention. FIG. 8 shows moveable collection device 20 returned to position below drain tray/catch basin 42 to receive additional flow and quantity of drain/waste water from drain pipe 54. Now, in connection with FIGS. 9a and 9b, an aspect of the interrelationship between opening 23 of moveable collection device 20 and drain tray/catch basin 42 will be described.

Figure 9A:
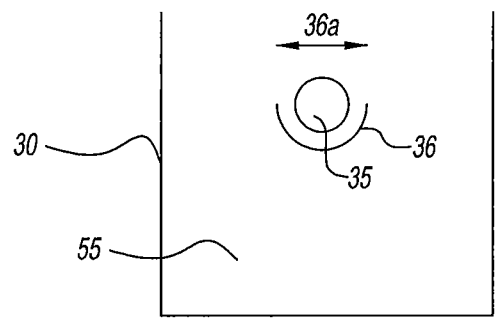
FIGS. 9a and 9b show views of the underside of the drain tray/catch basin according to one embodiment of the present disclosure.
Figure 9B:
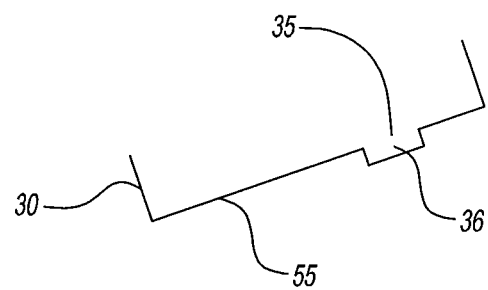

As shown in FIG. 9a, disposed on bottom 55 of drain tray/catch basin 42 is opening 91, described earlier but not shown, that is disposed above opening 23 of moveable collection device 20 while moveable collection device 20 is receiving drain/waste water flowing from drain pipe 54 into drain tray/catch basin 42. Surrounding a portion of the periphery of opening 91 is a protrusion 92. As shown in FIG. 9b, protrusion 92 may be a portion of bottom 55 of drain tray/catch basin 42, or may be an addition to bottom 55 of drain tray/catch basin 42, such as a vertically disposed flange member. Although shown as circular in FIG. 9a, opening 91 can be of any configuration (e.g., square, rectangular, oval, a combination of slots, and similar configurations). All that is necessary is that the inside periphery/diameter of opening 23 of moveable collection device 20 be sufficient to accommodate water flowing from the outer periphery/diameter of opening 91. In other words, the inner periphery of opening 23 regardless of its geometry should be sufficiently large to remain outside of the outer periphery of the corresponding, or opposing, geometry of opening 91. Also as shown in FIGS. 9a and 9b, preferably there is disposed a flange as protrusion 92 around at least a portion of opening 91. When employed, protrusion 92 may be used in the following manner and perform the following functions. In part, protrusion 92 assists in ensuring that drain/waste water flowing from drain pipe 54 into drain tray/catch basin 42 and therefrom into opening 23 of moveable collection device 20 is, in fact, more completely flowing into opening 23. In this respect, protrusion 92 may aid in directing drain/waste water from drain tray/catch basin 42 into opening 23 of moveable collection device 20 to avoid or limit "splash" or spillage of drain/waste water. In another aspect, protrusion 92 may serve as a safety device in the following manner. In a preferred embodiment, protrusion 92 has an inner periphery/diameter 93 that is large enough to accommodate the raised threaded portion of opening 23 (as mentioned with respect to FIG. 2) when screw cap 24 is not present, but insufficient to accommodate opening 23 when screw cap 24 is present. In this manner, moveable collection device 20 cannot be accidently placed back into position for receiving drain/waste water from drain tray/catch basin 42 with opening 23 closed with screw cap 24. This has the beneficial effect of preventing drain/waste water from being spilled or disposed in any place other than into opening 23 of moveable collection device 20. Also, when protrusion 92 acts to prevent moveable collection device 20 from being fully placed into position to receive drain/waste water, moveable collection device 20 will preferably protrude from rack 40 and prevent door 41 from closing (see, FIG. 4). In this respect, the present disclosure is simpler in design, construction and operation than that disclosed in the above DE10 2010 017 177 document that requires electromechanical switches and controls and fixed placement of the "water taxi" on the "trolley" to ensure that water taxi is properly placed upon return to the cooking device.

Other embodiments of constructing/designing opening 91 so that water does not empty while moveable collection device 20 is moved away for emptying or other reason are envisioned. For example, opening 91 may be closed by a slidable seal (not shown) that is slid longitudinally into open position for allowing drain/waste water to empty from drain tray 42 as moveable collection device 20 is placed into position and slid longitudinally into closed position as moveable collection device 20 is removed for emptying. This sliding motion can be provided, for example, by a catch on the slidable seal that engages with the top of the moveable collection device 20 and is pushed away rearwardly as moveable collection device 20 is placed into receiving position for filling and pulled back into place as moveable collection device 20 is removed from receiving position for emptying. In an alternative sliding arrangement, opening 91 may be closed by a seal that is rotatably slid into closed position as moveable collection device 20 is removed for emptying and rotatably slid into open position as moveable collection device 20 is placed back into position for receiving additional drain/waste water.

In the above detailed description, the specific embodiments of this disclosure have been described in connection with its preferred embodiments. However, to the extent that the above description is specific to a particular embodiment or a particular use of this disclosure, this is intended to be illustrative only and merely provides a concise description of the exemplary embodiments. Accordingly, the present disclosure is not limited to the specific embodiments described above, but rather, the present disclosure includes all alternatives, modifications, and equivalents falling within the true scope of the appended claims. Various modifications and variations of this disclosure will be obvious to a worker skilled in the art and it is to be understood that such modifications and variations are to be included within the purview of this application and the spirit and scope of the claims.

All of the patents, patent publications and other references referred to above are incorporated herein by reference for all that they contain as if the contents thereof have been fully set forth verbatim herein.

What is claimed is:

1. A cooking device comprising a housing including a cooking chamber and a drain for allowing drain/waste water to drain from the cooking device, wherein the cooking device is in cooperative relation with a device to hold the drain/waste water from the cooking device, the device to hold the drain/waste water comprising:
   a drain tray external to the cooking device for receiving the drain/waste water from the drain, wherein the drain tray is disposed away from and not connected to the drain, wherein the drain tray includes a drain tray opening disposed through the drain tray for allowing the drain/waste water to exit the drain tray; and
   a moveable collection device in cooperative association with but not connected to the drain tray, wherein the moveable collection device is moveable between a position contacting the drain tray and below the drain tray opening for receiving the drain/waste water from the drain tray opening and a position not contacting the drain tray and away from the drain tray opening for disposing the drain/waste water, wherein the moveable collection device includes a device opening for receiving the drain/waste water from the drain tray opening, and wherein the moveable collection device cooperates with the drain tray so that the drain tray continues to receive additional drain/waste water exiting the cooking chamber when the moveable collection device is moved away from the drain tray opening and not contacting the drain tray to the position for disposing the drain/waste water.

2. The cooking device according to claim 1, further comprising support for the drain tray, wherein the support is connected to the drain tray such that the drain tray rotates when the moveable collection device is moved to the position for disposing the drain/waste water.

3. The cooking device according to claim 2, wherein the support is connected to the drain tray such that the rotation of the drain tray causes the drain train to lower away from the drain and causes the drain tray opening to raise.

4. The cooking device according to claim 3, wherein the rotation of the drain tray creates a volume disposed away from the drain tray opening to receive additional drain/waste water from the drain.

5. The device according to claim 1, wherein the device opening for receiving the drain/waste water is also used for emptying the drain/waste water from the moveable collection device.

6. The cooking device according to claim 1, wherein the device opening for receiving the drain/waste water has associated therewith a neck disposed above the device opening.

7. The cooking device according to claim 6, wherein the neck is comprised of a threaded neck.

8. The cooking device according to claim 6, wherein the neck has associated therewith a closure.

9. The cooking device according to claim 8, wherein the drain tray further comprises structure associated with the drain tray opening, wherein the structure is disposed and configured to prevent the moveable collection device from being placed into position for receiving the drain/waste water from the drain if the closure is associated with the neck.

10. A method of receiving and disposing of drain/waste water produced during operation of a cooking device comprised of cooking chamber and a drain for allowing drain/waste water to drain from the cooking device, the method comprising:
    allowing the drain/waste water exiting the drain from the cooking device to be received by a drain tray, wherein the drain tray is disposed away from and not connected to the drain;
    allowing the drain/waste water in the drain tray to exit the drain tray by a drain tray opening disposed through the drain tray;
    allowing the drain/waste water that exits the drain tray by the drain tray opening to be received by a moveable collection device through a device opening, wherein the moveable collection device is disposed in cooperative relation with but not connected to the drain tray such that the moveable collection device is moveable between a position contacting the drain tray and below the drain tray opening for receiving the drain/waste water from the drain tray opening and a position not contacting the drain tray and away from the drain tray opening for disposing the drain/waste water;
    removing the moveable collection device away from the drain tray opening and not contacting the drain tray to dispose of the drain/waste water, wherein removing the moveable collection device automatically adjusts the dray tray and drain tray opening so that additional drain/waste may enter the drain tray but not exit therefrom.

11. The method according to claim 10, further comprising supporting the drain tray such that the drain tray rotates when the moveable collection device is removed to dispose the drain/waste water.

12. The method according to claim 11, wherein the supporting causes rotation of the drain tray such that the drain train lowers away from the drain and the drain tray opening rises.

13. The method according to claim 12, wherein rotation of the drain tray creates a volume in the drain tray disposed away from the drain tray opening such that the drain tray can receive additional drain/waste water from the drain.

14. The method according to claim 10, further comprising emptying the drain/waste water from the moveable collection device using the device opening.

15. The method according to claim 10, further comprising disposing a neck disposed above the device opening.

16. The method according to claim 15, wherein the neck is comprised of a threaded neck.

17. The cooking device according to claim 15, wherein the neck has associated therewith a closure.

18. The method according to claim 17, further comprising:
   associating structure with the drain tray opening, wherein the structure is disposed and configured to prevents the moveable collection device from being placed into position for receiving the drain/waste water from the drain if the closure is associated with the neck.

* * * * *